United States Patent [19]
Moriguti et al.

[11] 3,799,689
[45] Mar. 26, 1974

[54] OPERATING APPARATUS FOR GUIDE VANES OF HYDRAULIC MACHINE

[75] Inventors: Kazuo Moriguti; Nobuyasu Yokoi; Yukio Yamaguchi, all of Hitachi, Japan

[73] Assignee: Hitachi, Ltd., Tokyo, Japan

[22] Filed: May 11, 1972

[21] Appl. No.: 252,402

[30] Foreign Application Priority Data
May 14, 1971 Japan.............................. 46-38226
May 14, 1971 Japan.............................. 46-38228
May 14, 1971 Japan.............................. 46-38229

[52] U.S. Cl..................... 415/26, 415/30, 415/151, 415/163
[51] Int. Cl............................................. F01b 25/00
[58] Field of Search............. 415/26, 17, 30, 1, 150, 415/151, 163

[56] References Cited
UNITED STATES PATENTS
| 3,030,070 | 4/1962 | Krauss | 415/1 |
| 3,118,281 | 1/1964 | Gros | 415/17 |
| 3,533,709 | 10/1970 | Willi | 415/1 |

FOREIGN PATENTS OR APPLICATIONS
954,590  12/1956  Germany........................... 415/163

*Primary Examiner*—C. J. Husar

[57] ABSTRACT

An operating apparatus for the guide vanes of fluid, preferably hydraulic, kinetic energy machines, particularly turbines or the like, employs a servomotor (including a servo valve) to operate each of a plurality of guide vanes controlling the supply of motive fluid to the wheel or runner of the machine. Each of the servomotors is selectively driven by a signal from a frequency detector, which generates a signal proportional to the rotary speed of the runner, or by a signal from a signal generating means that provides a signal independently of the speed of rotation. The movement of each guide vane is fed back as an electric signal by a potentiometer having its resistance varied according to the opening degree of the guide vane associated therewith, which feedback signal will detect the presence of foreign matter interrupting the normal movement of a guide vane, which will be present as a detecting voltage of servomotor operating or driving the particular vane.

9 Claims, 8 Drawing Figures

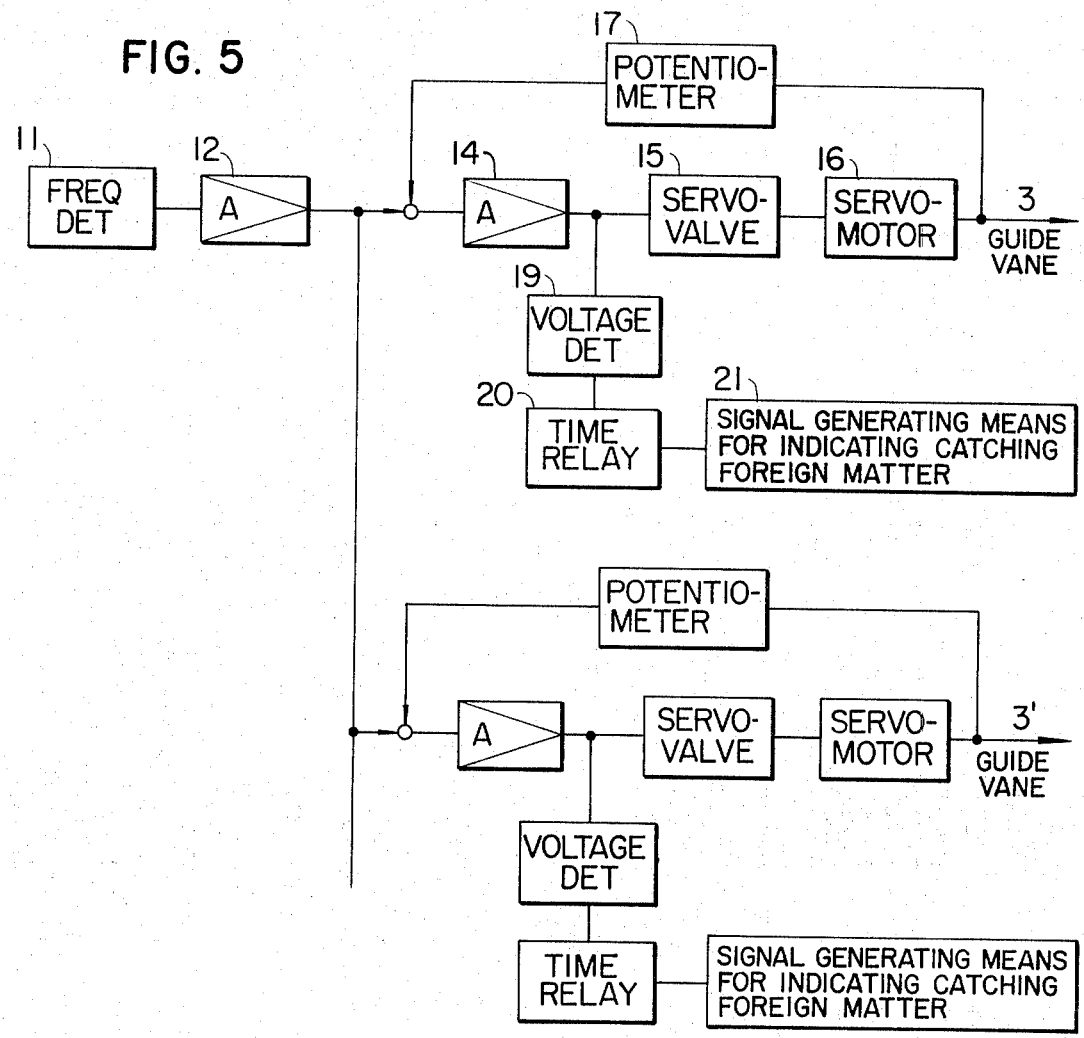
FIG. 5
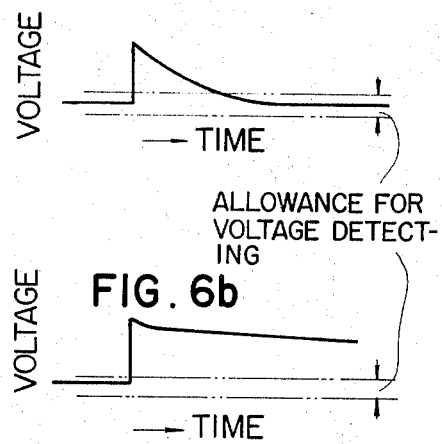
FIG. 6a
FIG. 6b
ALLOWANCE FOR VOLTAGE DETECTING
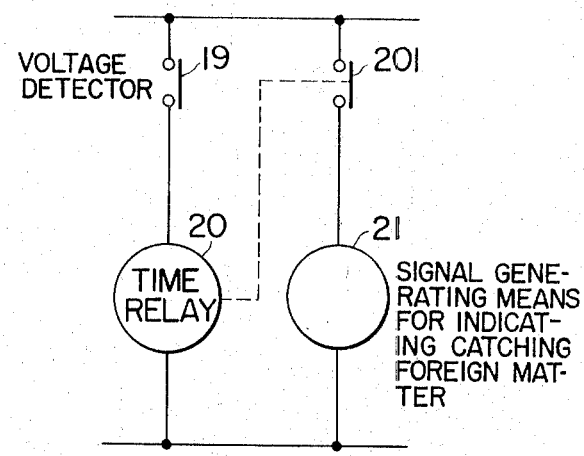
FIG. 7

3,799,689

OPERATING APPARATUS FOR GUIDE VANES OF HYDRAULIC MACHINE

BACKGROUND OF THE INVENTION

It is known to provide operating mechanisms for the guide vanes of fluid machinery, for example the guide vanes of a water turbine, a reversible pump-turbine mechanism, or a pump.

In hydraulic machinery, for example in a water turbine, all of the guide vanes are generally connected with a guide ring through respective links and operated by rotating the guide ring for adjustment. Since this guide ring is usually provided on the top of a head cover for the water turbine, the construction of the head cover is rather complicated. Further, in high pressure or high head water turbines, the guide vane spindles or shafts usually project considerably above the top of the head cover from the lower portion thereof, so that the spindles must be quite long, which is disadvantageous with respect to being uneconomical as to mechanical strength and manufacturing cost of the machine.

Further, guide vane operating apparatus constructed so that each guide vane is connected with and controlled by a separate servo mechanism having a mechanical feedback system, although known, has disadvantages. Under normal operating conditions, the degree of opening of the various guide vanes should be equalized for all of them, for if not equalized or at least balanced peripherally around the device, the unbalance or unequalization will set up vibrations and noises. Prior operating apparatus of this type have proved to be quite inconvenient in that each of the parts must be accurately manufactured and the adjustment for the degree of opening of the guide vanes must be done inside of the machine.

Foreign matter from a reservoir and the like, quite often enter in the machine and catch within the guide vanes. Prior machinery of the water turbine or the like type have been provided with means to prevent destruction of the machine under these conditions, particularly they are provided with a shear pin for connecting the guide vanes to the means for driving them. When the foreign matter is caught within the guide vane, the shear pin will protect the entire machine from destruction by shearing on overload. Thereafter, the shear pin may be exchanged for a new one after the machine has been shut down. However, the operation is time consuming and difficult because it must be done from within the machine.

When starting from a standstill or zero initial load with this type of machinery, the revolution or speed of the machine changes greatly with slight changes in the opening degree for the guide vanes. During this time, it is quite difficult to obtain smooth parallel control of the guide vanes to correspondingly produce smooth operation of the machinery.

SUMMARY OF THE INVENTION

Accordingly, it is an object of the present invention to provide operating apparatus for the guide vanes of fluid machinery, particularly hydraulic machinery, wherein the drawbacks or disadvantages of the prior art as mentioned above are avoided or greatly minimized.

The operating apparatus for the guide vanes is constructed so that each of the guide vanes is respectively connected with each of a plurality of several mechanisms, the movements of the guide vanes driven by the mechanisms are detected and transformed into correlated electrical signals by potentiometers, the thus produced signals are fed back into a controlling circuit for the mechanism, and under normal operating conditions, the degree of opening for each of the guide vanes is adjusted by variable resistors associated with the potentiometers.

Further, the operating apparatus for the guide vanes includes a device for detecting caught foreign matter within the guide vanes. When the guide vanes operate normally, the signals driving the mechanisms become substantially zero after a predetermined period. However in the case where the signal does not become substantially zero after the lapse of the predetermined time, this is an indication that foreign matter is caught within the guide vanes, and the control device is constructed to utilize this feature.

Also, the operating apparatus for the guide vanes will produce electrical signals in accordance with the speed of the rotary machine, preferably by means of a generator connected with the machine, or electrical signals will be set up independently of the speed of rotation for selectively operating the guide vanes through the driving mechanism.

BRIEF DESCRIPTION OF THE DRAWING

Further objects, features and advantages of the present invention will become more clear from the following detailed description of the drawing, wherein:

FIG. 5 is a block diagram of an operating apparatus for guide vanes of fluid rotary machinery, particularly a water turbine, which is provided with a device for detecting foreign matter according to the present invention;

FIG. 6a and 6b are charts showing the output voltages of the amplifier 14 under different conditions; and FIG. 7 is a schematic representation of a combination voltage detector and time relay.

DETAILED DESCRIPTION OF THE INVENTION

The present invention relates to apparatus for adjusting the position of fluid guide vanes for fluid rotary machinery in general, which may include various types of turbines, pumps, and the like. Particularly, the invention is related to the operating mechanism for adjusting the degree of opening for the normally stationary motor fluid supply guide vanes of a water turbine, which water turbine usage will be specifically described and illustrated for purposes of a preferred embodiment, although according to the broader aspects of the present invention, other usages are intended to be covered.

Figure 1:
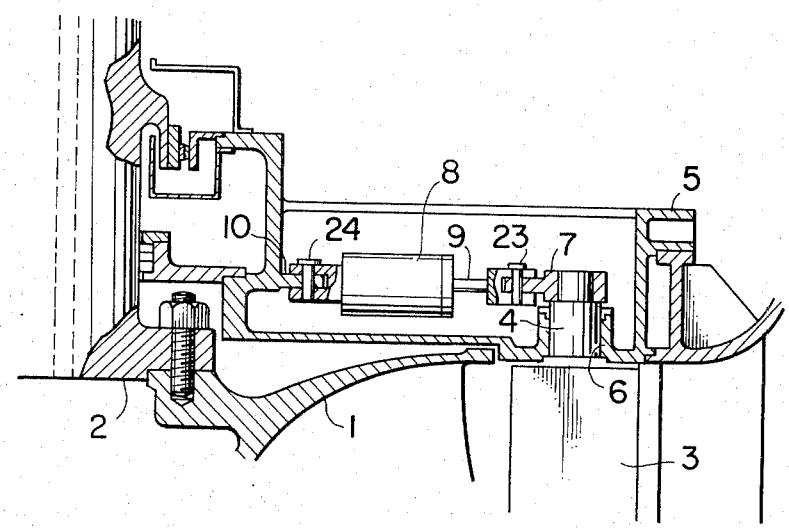
FIG. 1 is a partial radial plane cross sectional view of a water turbine showing a preferred embodiment of the operating apparatus for guide vanes of fluid rotary machinery according to the present invention.
Figure 3:
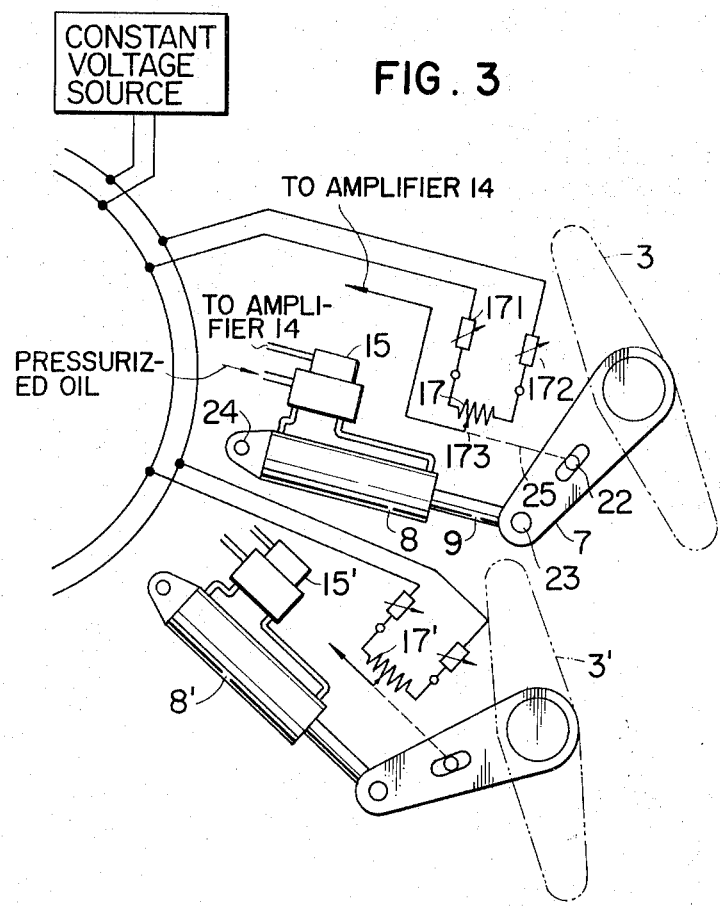
FIG. 3 is a schematic partial representation of an embodiment of the present invention according to FIG. 1.

With reference to FIG. 1, it is seen that a conventional runner or bucket 1, only partially shown, is secured to a main shaft 2. A plurlaity of guide vanes 3, 3', with further reference being to FIG. 3, are generally stationarily disposed around the circumference of the runner 1 for controlling the amount of water flowing to the runner 1 in a conventional manner according to the angularity of the guide vanes as adjusted about axes generally parallel to the axis of the main shaft 2. Each of the guide vanes has two opposed stems at its opposite ends for its pivotal mounting to the stationary portions of the machine. Since the above structure is quite conventional, it is only shown partially to illustrate the environment of the present invention.

The top stem 4 of the guide vane 3 is rotatably supported within a boss or bearing 6 of a head cover 5. One end of a lever 7 is drivingly fixed to the outer end of each of the top stems 4, and the other end of the lever 7 is drivingly connected with the piston rod 9 of a servomotor 8 by means of a rotatable pin connection 23. The opposite end of the servomotor 8 is pivotally connected with a stationary ring portion 10 of the head cover 5 by means of a rotatable pin 24. The servomotor 8 and the lever 7 are wholly mounted within the head cover 5, which is hollow for this purpose. Thus, the guide vane 3 does not need a long stem projecting over the upper face of the head cover, which will save in manufacturing cost and provide improved mechanical strength with a lighter mounting construction. It is understood that there are a plurality of such above-described mechanisms entirely about and unformly spaced around the periphery of the runner 1. With the physical arrangement of the guide vanes, runner, head cover, servomotor, connecting lever and the like being described as set forth above, the control portion of the operating mechanism for each guide vane is as follows.

Figure 2:
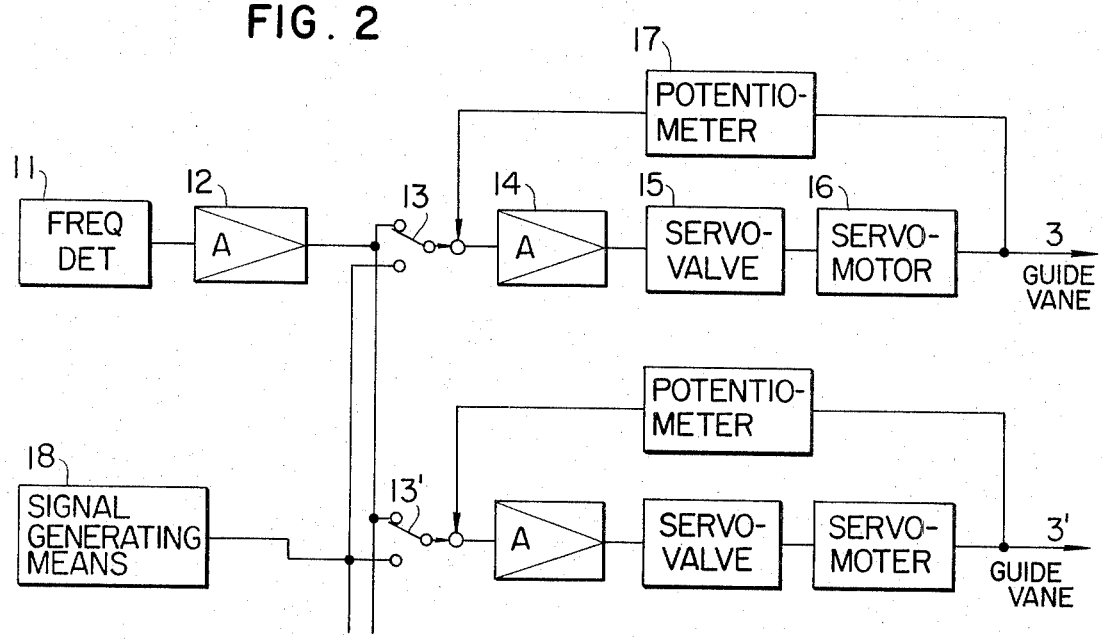
FIG. 2 is a block diagram of an operating apparatus wherein a frequency detector is electrically exchangeable for a signal generating means according to the present invention.

With reference to FIGS. 2 and 3, a frequency detector 11 will produce an electrical signal proportional to the speed of the runner 1, preferably by means of a generator connected with the water turbine to generate an electrical signal having a voltage proportional to the rotary speed of the water turbine. The signal from the speed or frequency detector 11 is fed to an amplifier 14 through an amplifier 12 and a switch 13. The amplifiers 12, 14 will amplify the signal from the detector 11 so that it will have an electrical value sufficient enough to drive the servo valve 15, which controls the pressurized control fluid, preferably oil, that flows to or from a servomotor 16. The servomotor 16, which includes the cylinder 8 and rod 9 will control the position of the guide vane 3 through the driving connection of the piston rod 9 and the lever 7, as partially described previously. The movement of the piston rod 9 of the servomotor 8, as schematically shown, will correspondingly move the movable tap 173 of a potentiometer 17, preferably by way of a pin and slot connection 22 between a lever 7 and one end of a connecting link 25 having its other end drivingly connected with the movable tap 173. The potentiometer 17 is electrically connected with a constant voltage source through variable resistors 171, 172, so as to convert movement of the tap (which tap movement is proportional to the movement of the piston rod 9 and accordingly the movement of the guide vane 3) into an electric signal that will be proportional to the movement of the guide vane. This thus produced electrical signal is fed back to the amplifier 14, for example as a gain control. All of the guide vanes 3 may be provided with operating mechanisms and controls separate from and identical to those described above for only one guide vane. Further, only some of the guide vanes around the periphery may be provided with the above-described mechanisms and controls. Further, some or all of the guide vanes may have their angular position desirably controlled by signal generating means 18, which will produce a signal that is independent of speed of rotation, but which will be processed for control of the guide vanes associated therewith in the same manner as is the processing of the signal produced by the frequency detector 11 and amplifier 12 previously described. However, it is most preferable to provide the two types of signal sources in combination as set forth in FIG. 2.

During a normal run, the switches 13, 13', will be in their indicated position so as to connect the frequency detector 11 and its amplifier 12 with both of the illustrated circuits for the guide vane 3 and for the guide vane 3'. As the speed of the water turbine changes with changes in its load, a variable voltage, that is an electric signal representing the required opening degree of the guide vanes is produced by the frequency detector and the opening degree of each guide vane is thereby controlled in proportion to the voltage applied to the amplifier 14. Under the normal operating condition, the individual guide vanes would assume the same opening degree, assuming that the device was initially set up with proper adjustments. Unbalances in the opening degree of the guide vanes may produce abnormal vibrations and noises. This problem can be solved by adjusting the variable resistors connected to the opposite ends of each potentiometer. When comparing this adjustment of the variable resistors 171, 172 with the conventional mechanical means employing threaded connections or threaded adjustments, the adjustment of the present invention is quite advantageous because it is free from the problems of unlocking threaded connections and the adjustments may be made remotely from the water turbine and even during operation of the water turbine.

Further, the provision of the switches 13 and 13', according to the present invention, makes it possible to achieve various types of run controls, an example of which is the speed control during startup. At the time of starting with zero initial load, the speed will change greatly with slight changes in the degree of opening of the guide vanes. In order to cope with this situation, a required or predetermined number, for example one-half, of the guide vanes may be connected to the frequency detector 11 and its amplifier 12 for controlling the degree of opening of the thus connected guide vanes, while the remaining ones of the guide vanes may be connected to the signal generating means 18 that will initially provide a full closed signal to hold them in their fully closed position. Of course, the two sets of vanes would be positioned around the periphery so as not to produce unbalance. Further, it would be possible to hold any desired number of the guide vanes in a particular position. Thus, with many of the guide vanes purposely held in a closed position during startup, the sensitivity of the device would not be as great.

Figure 4:
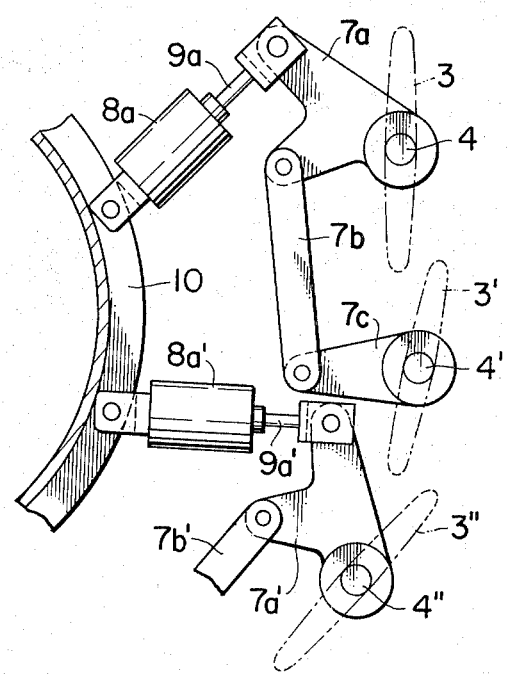
FIG. 4 is a plan view, similar to FIG. 3, but of another embodiment of the present invention.

While in the above description of a preferred embodiment, the number of servomotors and cooperating control circuits is identical in number to the number of guide vanes for the rotary machine, other constructions are contemplated. For example, as set forth in FIG. 4, all of the guide vanes arranged around the circumference of the runner may be divided into a plurality of groups, for example, one group having guide vanes 3 and another group having guide vanes 3', which groups are arranged such that there will be no unbalance. For the two groups, each guide vane 3, 3' will respectively have a lever 7a, 7c, which will be rotatably fixed to its upper stem 4, 4'. The other end of the lever 7a is drivingly and pivotally connected to the outer end of a piston rod 9a of a servomotor 8a, which servomotor is in turn connected to a ring portion 10 of the head cover; further, the lever 7a is drivingly connected to an adjacent lever 7c for the guide vane 3' by a link 7b. Thus, each pair of guide vanes 3, 3' are operated by a single servomotor 8a, and under normal operating conditions, it is necessary that the degree of opening of these guide vanes be equalized. In a similar manner, the adjacent guide vane 3'', which would correspond to the guide vane 3, is connected to the next adjacent guide vane (not shown), which would correspond to the guide vane 3' through a lever 7a', a link 7b' and a lever not shown, and is further connected to the piston rod 7a' of the servomotor 8a'. In this manner, the pattern is repeated around the periphery of a rotary machine that is otherwise identical with that previously described with respect to FIG. 1. The previously described control of FIG. 2 is equally applicable to the embodiment of FIG. 4.

The control of FIG. 2 may further include means for detecting the catching of foreign matter within the guide vanes. In FIG. 5, a specific foreign matter detecting means is illustrated in the control circuit of FIG. 2, with the signal generating means being removed and the switch 13 being assumed in its full line position of FIG. 2, for a simplified description. Since the circuits of FIGS. 2 and 5 are merely partial showings of the complete control circuit, the elements 11 through 17 have already been described in structure and function, although it is further contemplated that the two circuits may be used separately.

With reference to FIG. 5, the servo valve 15 is controlled by the signal coming from the amplifier 14, as previously described. This signal will be the difference between a signal coming from the frequency detector 11 as amplified by the amplifier 12, which corresponds to the rotary machine speed and a signal coming from the potentiometer 17, which corresponds to the position of the associated guide vane 3. The difference between these two signals will be passed through the amplifier 14 and be delivered as a voltage proportional to the difference. In the normal run, the output voltage of the amplifier 14 will be substantially reduced to zero after the lapse of a certain predetermined time, as shown in FIG. 6a. If foreign matter is caught within a particular guide vane, this guide vane will not move or be adjusted in conformity with the specified voltage of the frequency detector, so that the output voltage of the amplifier 14 will not be reduced to substantially zero after the above-mentioned predetermined time, as shown in FIG. 6b. That is, after the predetermined time from the command voltage change for the frequency detector 11, all of the guide vanes except the one within which foreign matter is caught will have moved sufficiently to adjust the potentiometer associated therewith so that the respective output voltages of the amplifiers 14 will be substantially zero, except for the output voltage of the amplifier 14 associated with the particularly guide vane wherein foreign matter has interrupted the commanded movement of the guide vane. Thus, this difference in the output voltage of the amplifier 14 is correlated to the presence of foreign matter within its associated guide vane, so that this voltage is an indication of the detected foreign matter. For each guide vane circuit, the voltage detector 19 is responsive to the output voltage beyond an allowance range of the amplifier 14.

The voltage detector 19 is shown combined in circuit with a time relay 20, in FIG. 7. With the voltage detector 19 operating, that is detecting a voltage output from the amplifier 14, the voltage will be fed to the time relay 20. When a signal change is produced by the frequency detector 11 to command a corresponding adjustment of the associated guide vane, the time relay will allow for a sufficient predetermined time to normally complete all vane adjustments so that the output of the amplifier 14 will be reduced to substantially zero. However if foreign matter is caught within a particular guide vane, its associated amplifier 14 will still have an output voltage beyond the allowance range as shown in FIG. 6b, so that after the time has run as determined by the time relay 20, the voltage detector 19 will, with the time relay 20, close the switch 201 to thereby feed the voltage output of the amplifier 14 to the associated signal generating means 21 for indicating the catching of foreign matter within the particular guide vane. It is understood that one of the circuits of FIG. 7 is provided for each of the guide vanes as shown in FIG. 5. The signal generating means for indicating the catching of foreign matter may be a buzzer, a pilot lamp, or an electric signal capable of controlling or shutting down the water turbine.

In prior art operating apparatus for guide vanes, a shear pin would be sheared to protect the entire water turbine when foreign matter was caught within one or more of the guide vanes. However in the present invention, as the operating apparatus applies the servomotor with a lighter operating force than one applied in the prior art water turbines, the operating apparatus according to the present invention is able to prevent the breakage of any parts and does not require a shear pin for protection, and the means 21 will indicate to an operator or automatic control circuitry the catching of foreign matter within a guide vane, and further identify the particular guide vane. Accordingly, it is unnecessary to employ a shear pin.

The above-described circuitry for detecting the catching of foreign matter within guide vanes as set forth specifically with respect to FIGS. 5–7 may of course be set into operation when the switches 13, 13' are moved to a position wherein the signal generating means 18 will control the adjustment of all or some of the guide vanes. Further, the guide vane embodiments of FIGS. 3 and 2, as well as other constructions may be used with the above-described circuitry as an electrical control.

While specific preferred embodiments of the present invention have been set forth in detail for purposes of illustration and are quite advantageous in their own right according to the more narrow aspects of the present invention, further embodiments, variations and modifications are contemplated according to the spirit and scope of the present invention as defined by the following claims.

What is claimed is:

1. An operating apparatus for the guide vanes of a rotary fluid machine having a rotor, comprising: valve means having a plurality of fluid guide vanes mounted for movement between open and closed positions circumferentially of the rotor for controlling the flow of working fluid between the rotor and the exterior of the rotary machine; a plurality of servomotors, each of which is drivingly connected with a corresponding plurality of at least some of said guide vanes to respectively control the positions of the connected guide vanes between their open and closed positions; signal generator means for producing a signal correlated to the rotational speed of the rotor for controlling operation of each of said servomotors to correspondingly control the positions of said connected guide vanes; a plurality of separate position feedback means respectively associated with each of said servomotors for producing a position signal proportional to the movement of the guide vane associated with the particular servomotor; and further means for adjusting each of the position feedback means to individually change the position signal independently of vane position for calibration purposes to obtain uniformity of control for all of the vanes.

2. The apparatus of claim 1, wherein said feedback means are each potentiometers having a movable tap drivingly connected to a corresponding guide vane and said further means are variable resistors provided in circuit with said potentiometers.

3. The apparatus of claim 1, further including generating means for producing a desired control signal independent of rotor speed; switch means for selectively connecting the output of either said signal means or said generating means to said servomotors.

4. The apparatus of claim 3, wherein there are a plurality of said switch means corresponding in number and respectively associated with said servomotors; and at least some of said switch means being operable independently of others of said switch means.

5. The apparatus of claim 1, wherein at least two of said guide vanes are drivingly connected to a servomotor, for each of said servomotors.

6. The apparatus of claim 5, including a plurality of pivotally mounted first levers each having one end respectively drivingly connected to each of said servomotors and its opposite end respectively drivingly connected to one of said at least two guide vanes; a plurality of pivotally mounted second levers each having one end respectively drivingly connected to the other of said at least two guide vanes; and a plurality of connecting links respectively drivingly connected between said first levers and the other end of said second levers.

7. The apparatus of claim 1, including means for comparing the output of said feedback means and said signal means to produce an output proportional to the deviation of the actual guide vane positions with respect to their desired positions; and caught foreign matter indicator means responsive to said comparing means position deviation output.

8. The apparatus of claim 7, including voltage detector means to detect voltage differences between said signal means and said feedback means beyond a predetermined range; and time delay means in circuit with said voltage detector means for rendering operative said indicator means only after a predetermined period from a change in the control from said signal means.

9. The apparatus of claim 7, including delay means for preventing said indicator means from responding to said comparing means position deviation output for a predetermined period after said signal means operates to charge the position of said connected guide vanes.

* * * * *